Nov. 29, 1938. F. S. SMITH Re. 20,932

ART AND APPARATUS FOR TREATING TOBACCO AND THE LIKE

Original Filed March 5, 1928 2 Sheets-Sheet 1

Franklin S. Smith INVENTOR

BY Robert S. Blair ATTORNEY

Nov. 29, 1938. F. S. SMITH Re. 20,932

ART AND APPARATUS FOR TREATING TOBACCO AND THE LIKE

Original Filed March 5, 1928 2 Sheets-Sheet 2

Franklin S. Smith INVENTOR

BY

Robert S. Blair ATTORNEY

Reissued Nov. 29, 1938 Re. 20,932

UNITED STATES PATENT OFFICE 20,932

ART AND APPARATUS FOR TREATING TOBACCO AND THE LIKE

Franklin S. Smith, New Haven, Conn., assignor to Thermal Engineering Corporation, Richmond, Va., a corporation of Virginia Original No. 1,952,781, dated March 27, 1934, Serial No. 259,190, March 5, 1928. Application for reissue September 12, 1938, Serial No. 229,568

32 Claims. (Cl. 131—55)

This invention relates to a method and apparatus for treating tobacco and the like and more particularly to a method and apparatus for conditioning or preparing tobacco for subsequent working thereof into tobacco products.

One of the objects of this invention is to provide a method of conditioning tobacco leaves for use in subsequent stages of manufacture of tobacco products such as cigars, for example, and which may be rapidly and conveniently carried on in practice. Another object is to provide a method of the above-mentioned nature capable of producing thoroughly dependable and highly efficient results and readily adaptable to meet the varying conditions met with in the manufacture of tobacco products. Another object is to provide a method of the above-mentioned nature which may be inexpensively carried on and capable of achieving vast savings in time over methods heretofore known and/or practiced. Another object is to provide a thoroughly practical apparatus for treatment of tobacco and like products and which will be of compact and durable construction and adapted for rapid and convenient manipulation in carrying out the process of treatment. Another object is to provide an apparatus of the above-mentioned character capable of rapid and highly efficient action and well adapted to meet the varying conditions of practical use. Another object is to provide an apparatus of the above-mentioned nature capable of simple, dependable and rapid manual control and adapted for rapid charging thereof with the products to be treated and for rapid removal therefrom. Another object is to provide an apparatus of the above-mentioned character having a high capacity and large space factor.

As conducive to a clearer understanding of certain features of this invention, it may at this point be noted that in the manufacture of such tobacco products as cigars, for example, it is necessary to moisten the cured tobacco leaves with water in order to make them sufficiently pliable and tenacious to work, as distinguished from the generally somewhat dry and brittle condition of the cured tobacco leaves themselves. If the tobacco leaves are to be used for cigar wrappers, discoloration and spotting thereof have to be carefully avoided. The moistening of tobacco leaves by the water contact method consisting generally in wetting the tobacco by immersion in or by spraying with water and then storing the tobacco to permit equalization of the moisture is highly disadvantageous in that the leaves are usually darkened in color, are oftentimes spotted and unless the method is skilfully carried on become over-wetted so that the leaves are soft, tender and difficult to work. Another method heretofore carried on is known as the humidor method; this method, however, is inherently very slow, and its space factor is very low. If the leaves are not spaced apart when treated by the humidor method, the time required to approach uniform moistening of the leaves is very greatly increased while the spacing of the leaves results in frequent damage due to the fact that the tobacco leaves are oftentimes dry and brittle. One of the dominant aims of this invention is to provide a method and apparatus in which the many disadvantages, some of which have been noted above, of methods and apparatuses heretofore employed are effectively overcome, better results achieved, and many thoroughly practical economies effected. Other objects will be in part obvious or in part pointed out hereinafter.

The invention accordingly consists in the features of construction, combination of elements, arrangements of parts and in the several steps and relation and order of each of the same to one or more of the others, all as will be illustratively described herein, and the scope of the application of which will be indicated in the following claims.

In the accompanying drawings, in which is shown one of the various possible embodiments of the mechanical features of this invention.

Similar reference characters refer to similar parts throughout the several views in the drawings.

Figure 1:
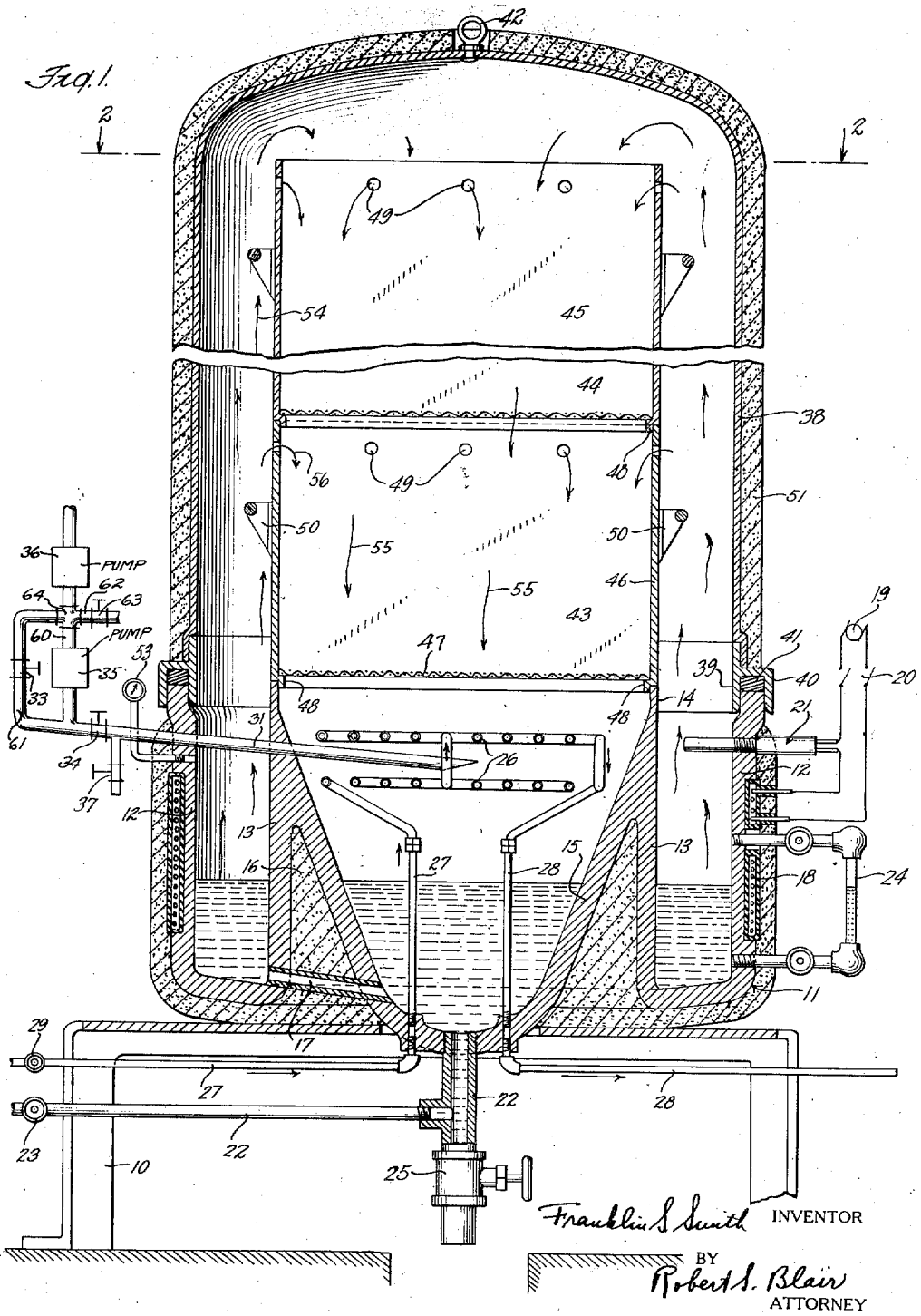
Figure 1 is a vertical central section through the apparatus.

Referring now to the drawings and more particularly to Fig. 1, there is shown at 10 a supporting frame of any suitable construction adapted to carry what will be termed hereinafter the base portion of the apparatus generally indicated at 11; this base portion 11 is preferably of a generally cylindrical shape and is preferably made of any suitable metal. Spaced inwardly from the outer wall 12 thereof is an inner wall 13 substantially concentric with the outer wall 12, the two walls with the bottom portion therebetween forming a ring-like or annular chamber. The upper portion of the inner wall 13 preferably merges from the substantially circular configuration of the lower portion of the wall member 13 into a substantially square portion with rounded corners, as is indicated at 14 in Fig. 2, the purpose of which will be more clearly set forth hereinafter. The base portion 11 is formed within the inner wall 13 to provide a central receptacle 15 conveniently shaped substantially as shown in Fig. 1, it being noted that the side walls of the receptacle 15 are joined to or preferably integrally formed with the inner wall 13 but taper downwardly and inwardly away from the wall 13 to provide a substantially annular space between the annular chamber 12—13 and the inner receptacle 15; this annular space is filled with a suitable heat insulating material indicated at 16. The inner central receptacle 15 preferably extends below the outer portions of the base portion 11 and conveniently serves as a means to which the supporting frame 10 may be secured to hold the entire apparatus in place. A conduit 17 connects the annular chamber 12—13 with the receptacle 15.

Suitably related to the outer wall 12 of the base portion 11 and preferably substantially embedded therein is an electric heating unit 18 preferably extending around the entire periphery of the base portion 11. The heating unit is supplied with energy from any suitable current source, diagrammatically indicated at 19, and the circuit of the heating unit 18 is completed through a suitable manually controlled switch 20 and through a thermostatically controlled switch generally indicated at 21, the temperature responsive portion of which extends into the upper portion of the annular chamber 12—13, as will be clear from Fig. 1.

The annular chamber 12—13 and the receptacle 15 may be supplied with water through a conduit 22 controlled by a valve 23, the conduit 22 leading preferably into the base of the central receptacle 15. A water gauge generally indicated at 24 serves to indicate the height of the water in the base portion 11 of the apparatus. A drain valve 25 connected in the conduit 22 and between the valve 23 and the base portion 11 of the apparatus serves to permit the water to be drained out of the apparatus.

In the upper portion of the inner receptacle 15 are supported a suitable number of spiral coils of conduit or piping and in Fig. 1 I have illustrated two serially connected spiral coils of piping indicated at 26; these coils 26 serve to expose to the chamber formed by the receptacle 15 a surface area of suitable expanse and through these coils a suitable cooling fluid may be passed. Thus cooling water of appropriate temperature may be passed through the coils 26 by means of the inlet conduit 27 and the outlet conduit 28, suitable valves 29 and 30 being provided to control or adjust the rate of flow of the cooling fluid through the coils 26.

A pipe or conduit 31 passes in a generally radial direction through the walls 12 and 13 of the base portion 11 and extends into the chamber formed by the receptacle 15 to a point substantially centrally thereof and preferably in between the two condensing coils 26. To the outer end of the pipe 31 is connected a suitable exhausting apparatus which preferably takes the form and arrangement as shown in Fig. 1. Thus I prefer to employ an exhaust pump diagrammatically indicated at 35, the inlet of which is connected to the pipe 31, a valve 34 controlling the latter. The outlet of the pump 35 is connected by pipe 60 to the intake of another exhaust pump diagrammatically indicated at 36. Pump 35 is what may be termed a "fine" pump, while pump 36 is what may be termed a "coarse" pump, the former being capable of exhausting a vessel to a relatively much lower pressure than the latter. The two pumps I prefer to arrange so that either one or both of them may be operated to exhaust through the pipe 31. This I may achieve by providing a by-pass pipe 61 about the pump 35, a valve 33 being included in the by-pass pipe 61, and by connecting to the pipe 60 (on the exhaust side of pump 35) a pipe or conduit 62 which may be opened to the atmosphere by a valve 63. A cross-connection 64 conveniently serves to take part in simplifying the connections.

Thus, if valves 33 and 63 are closed, both the coarse pump and the fine pump are operatively connected to the pipe 31, and it will be noted that the two pumps are arranged serially. On the other hand, if it is desired to make only pump 35 effective, valve 33 is closed and valve 63 is opened, the pump 35 being thus made to exhaust through the pipe 62. Furthermore, should it be desired to make effective only the pump 36, then valve 63 is closed and valve 33 is opened to connect pump 36 to the pipe 31 by way of the by-pass 61.

A valve 37 connected to the exterior portion of the pipe 31 permits the latter to be opened to the atmosphere.

The upper portion of the apparatus consists in part of a preferably dome- or bell-like member 38 of preferably substantially circular cross-section and of any suitable height as will be more clearly set forth hereinafter; the dome-like member 38 is thus shaped to form a counter-part to the base portion 11 of the apparatus, and at its lower peripheral portion is suitably formed or shaped to provide spaced peripheral flanges 39 and 40 between and within which is received and held a peripherally extending gasket 41 of any suitable material such as rubber or cork, for example. The upper dome portion 38 rests upon the upper peripheral portion of the wall 12, which is received between the flanges 39 and 40 and is thus made to contact with the gasket 41. The portion 38 is provided with suitable means such as a lifting ring 42, by means of which the upper portion 38 of the apparatus may be lifted off of the lower or base portion 11.

The upper substantially square portion 14 of the inner wall 13 of the base portion 11 is adapted to support a series of stacked receptacles 43, 44, 45 etc. These receptacles, hereinafter termed flue-baskets, are adapted to receive the material to be treated and are preferably of substantially similar construction so as to be interchangeable. A preferred form of construction is illustrated in the drawings. Each flue-basket preferably consists of a side wall member 46 made preferably of sheet metal, substantially square (see Fig. 2) but with rounded corners. The bottom is preferably in the form of a screen as is indicated at 47 (see Figs. 2 and 3), while the lower end of the sheet metal side wall portion 46 is provided with a flange 48 extending downwardly but displaced inwardly relative to the plane of the side walls 46, as is clearly shown in Fig. 3. Suitable apertures 49 adjacent the upper peripheral portion of the side walls 46 are suitably spaced about the flue-basket and, to facilitate handling of the baskets individually, suitable handles 50 are secured thereto.

Moreover, the upper portion 14 of the wall 13 of the base portion 11 and the sheet metal side portions 46 of the flue-baskets are of substantially the same configuration, so that a flue-basket, such as the basket 43 of Fig. 1, may be set upon the wall portion 14 while upon the flue-basket 43 any suitable number of additional flue-baskets, such as the baskets 44 and 45, for example, may be stacked in alignment with each other and with the wall portion 14. In each instance the inner depending flange 48 serves to hold the superimposed parts in alignment and in effect acts like the male part of a telescoping joint of which the female part is either the wall portion 14 or the side wall 46 of a flue-basket. The height of the apparatus may be suited to any desired number of containers or flue-baskets with which it may be desired to charge the apparatus.

The apparatus is suitably lagged as at 51 with a suitable heat insulating material of appropriate thickness.

Figure 2:
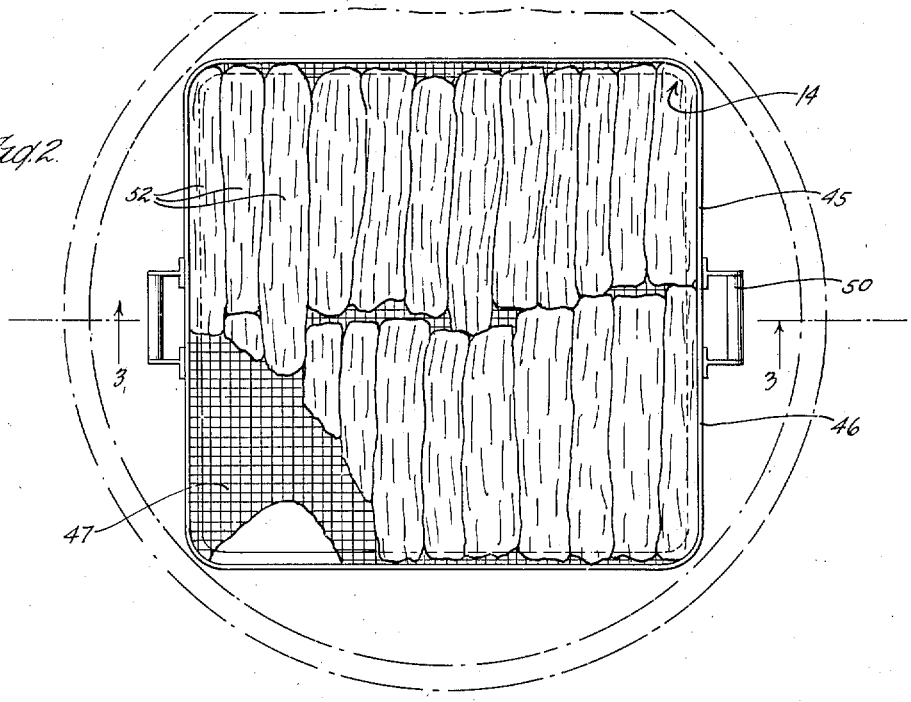
Figure 2 is a horizontal sectional view on a slightly enlarged scale, as seen along the line 2—2 of Fig. 1.
Figure 3:
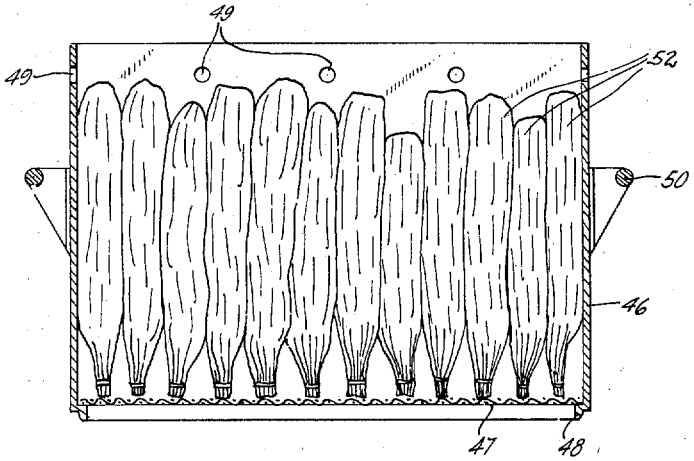
Figure 3 is a vertical central section of a portion of the apparatus taken along the line 3—3 of Fig. 2.

Considering now the method of treating tobacco in accordance with my invention, it is first to be noted that tobacco leaves, whether in the form of individual leaves, hands of leaves, or carrots of leaves, may be treated, and the tobacco, in any of these forms, is placed within the flue-baskets. Preferably the tobacco is placed in the baskets somewhat loosely and with the stems or axes of the leaves extending generally parallel to the vertical axis of the flue-basket in which they are placed. In Figs. 2 and 3 is shown a flue-basket 45 filled with hands of leaves indicated at 52, and from Fig. 3 it will be noted that the stem terminal portions of the leaves rest upon the screen bottom 47. Thus the tobacco leaves are stacked not only so that the axes of the leaves extend substantially parallel to the vertical axis of the flue-basket but also so that the weight of the bundles of leaves is transmitted to the bottom screen 47 through the bunched and generally tied together stems, thus preventing substantial injury to the leaves.

A suitable number of flue-baskets filled with tobacco leaves as above described is then stacked, one upon another, upon the wall portion 14 of the base portion 11 of the apparatus; the upper dome-like portion 38 is then placed over the stacked flue-baskets and brought to rest upon the upper peripheral portion of the outer wall 12, the weight of the member 38 acting initially to apply sufficient compression to the gasket 41 to make a substantially air-tight joint between the upper and lower portions of the apparatus.

The side walls of the stacked flue-baskets will be seen to form substantially a vertical extension of the upper portion 14 of the inner wall 13 of the base 11 and form in effect a flue connnecting the interior of the inner receptacle 15, by way of the open upper end of the uppermost flue-basket and the lateral passage or flue between the stacked flue-baskets and the dome-like member 38, with the annular chamber 12—13. Furthermore, it will be noted, the entire apparatus is air-tight in that the juncture between the upper portion 38 and the lower portion 11 of the apparatus is sealed by the gasket 41.

After having drained off the water through the valve 25 followed by the subsequent closing the latter valve, the heating of the chamber 12—13 is commenced, as by closure of the switch 20 which connects the heating unit 18 to the source of current 19. The thermostatic control switch 21 is adjusted to control the circuit of the heating unit 18 so as to maintain constant a temperature of about 40° C. Valves 29 and 30 are then opened to cause the passage through the condenser coils 26 of cooling water, and valve 37, connected to pipe 31, is closed. Pumps 35 and 36 are set into operation. Valves 33 and 63 are then closed and valve 34 opened so that both the rough pump and the fine pump proceed to exhaust the apparatus. By way of example, the rough pump 36 may be designed to be capable of reducing the pressure within the apparatus to about 55 mm. of mercury, and the fine pump 35 may be designed to reduce the pressure to one on the order of 2 mm. of mercury. The pumping operation is continued until the desired low pressure limit, indicated by the pressure gauge 53 (Fig. 1) is achieved, and this low pressure limit may, for example, be about 2 mm. of mercury.

At this point it may be noted that the steps of my method whereby the air or gaseous content is removed from the apparatus achieve certain very important advantages. The fact may generally be noted that the presence of gases or air greatly retards the diffusion of other gas or vapor molecules and where water vapor is intended to be diffused the presence of gases or air retards the diffusion of the water vapor to a very deleterious extent. Moreover, the rate of moistening of materials like tobacco leaves, for example, is also greatly retarded if the leaves are left in a gaseous atmosphere of substantial pressure; this because the water vapor must by diffusion first penetrate the relatively stationary gas film which contacts with and envelops each leaf. By appropriately reducing the pressure of the atmosphere within the apparatus the retarding effect upon the diffusion of water vapor by the presence of air or gas is greatly minimized; more particularly, the collision frequency between water vapor molecules and gas molecules is greatly reduced and thus the diffusion of the water vapor is materially facilitated. Furthermore, the substantial decrease in the density of the gas in the relatively stationary gas film enveloping each individual leaf removes what has heretofore been a serious obstacle to the penetration of water vapor into the tobacco leaf. Thus a highly efficient diffusion of water vapor may be achieved to bring the water vapor into the immediate region of the tobacco leaf, while, due to the great decrease in the density of the gas film, the water vapor may much more readily penetrate the film and be sorbed by the leaf.

The exhaustion of the apparatus having been effected as above described, I now open valve 23 preferably slowly to permit water to be slowly admitted into the base portion of the apparatus, it being noted that the water intake pipe 22 is connected to the receptacle 15 so that the water enters the latter first and thereafter supplies chamber 12—13 through the conduit 17. During this relatively slow admission of water to the apparatus, the continued pumping effects a relatively rapid removal of most, if not all, of the gases dissolved in the water. When sufficient water has been introduced into the apparatus, indicated by the water gauge 24 and approximately to the level illustratively shown in Fig. 1, the valve 23 is closed. The exhausting may continue for a few minutes so as to insure the removal of dissolved gases introduced into the apparatus by way of the water. In this manner a very high percentage, in fact upwards of 99%, of the non-condensable gases of the air are removed from the apparatus, its walls, and from the parts therein, as well as from the material to be treated.

The introduction of the water into the heating chamber 12—13 under this reduced pressure causes the water promptly to boil at relatively low temperature, the heating unit 18 supplying the heat of evaporation. The heating unit is controlled by the thermostatic switch 21, as above noted, and, being set for 40° C. by way of illustration, maintains substantially constant an average temperature of water vapor of 40° C.; this corresponds substantially to a vapor pressure of about 55 mm. of mercury. The water vapor thus produced passes upwardly, as indicated by the arrows 54, between the inner substantially cylindrical wall of the dome-like portion 38 and the stacked substantially square flue-baskets; reaching the top portion of the dome member 38, the water vapor is deflected and thence passes downwardly through one flue-basket after the other, hence sweeps past and into intimate contact with the tobacco leaves stacked in the flue-baskets, and is sorbed in part by the tobacco leaves which thus become moistened. The remainder of the water vapor passes on downwardly in the direction of the arrows 55 into contact with the cooling coils 26, whence condensation takes place and a resultant reduction in pressure immediately beneath the screen bottom of the lowermost flue-basket. The condensed water vapor may accumulate in the receptacle 15 and maintains a supply for the chamber 12—13 by way of conduit 17.

The condensation that is brought about by way of the condensing coils 26 assists in preventing the establishment of dynamic equilibrium of the water vaporizing system, it being noted that the sorption by the tobacco of substantial portions of the water vapor is a contributing factor toward this action of the condenser coils. This continued action of preventing establishment of dynamic equilibrium in the evaporation system makes it possible to continue the evaporation of water in the chamber 12—13 at substantially the same temperature (maintained substantially constant by the thermostatic control device 21) and at substantially the same average pressure, while at the same time an effective movement of water vapor into intimate and efficient contact with the tobacco is achieved. The apertures 49 adjacent the upper ends of the side wall portions 46 of the flue-baskets permit the diversion of water vapor from the upwardly moving steam (indicated by the arrows 54) into the individual flue-baskets which are underneath the uppermost flue-basket; thus, a uniform distribution of water vapor throughout the tobacco in the stacked flue-baskets is effectively achieved.

Moreover, since the tobacco leaves have been so placed in the flue-baskets that the general planes of the leaves extend vertically, or generally parallel to the downward direction of flow of the water vapor, a high efficiency of exposure of the leaves to the water vapor is achieved; it may additionally be noted, however, that the water vapor in effect sweeps into contact with and along the tobacco leaves and does so at relatively high velocity, sweeping whatever non-condensable gases that may remain in accumulation on the surfaces of the tobacco leaves out of the way and downwardly into the condensing chamber formed by the receptacle 15. In this chamber these gases are thus made to accumulate, where they may remain, being of greater density than the water vapor itself. I may, however, during the period of treatment of the tobacco, continue the exhausting apparatus in operation (as by leaving valve 34 open) so that it may remove such accumulated non-condensable gases. In so doing, however, I prefer to use the coarse pump 36 only, or I may use only the fine pump 35 but throttled, as by adjusting the valve 34, so that the reduced total pressure (illustratively, as above, about 2 mm. plus 55 mm.) is not lowered. In thus maintaining the exhausting apparatus in continued operation, I may achieve further distinct advantages. For example, the exhausting apparatus will remove not only such non-condensable gases that have been swept into the condensing chamber but will also remove from the latter a certain amount of water vapor. Such removal of water vapor from a point generally underneath the stack of flue-baskets acts to assist in preventing the establishment of dynamic equilibrium of the water evaporating system. That is, not only do the condensing coils 26, by their action in condensing water vapor, and the sorption of the vapor by the tobacco prevent establishment of dynamic equilibrium, but also the pump may be utilized to prevent or to assist in preventing establishment of such equilibrium by a physical removal of water vapor itself. Thus a rapid and highly efficient movement of water vapor into contact with the tobacco leaves may be achieved. It is to be understood, however, that highly efficient results may be achieved without continuing the operation of the exhausting apparatus.

The length of time necessary to appropriately condition tobacco depends upon various factors among which may be noted the quality of the tobacco, its initial condition as to moisture content, and the manner in which the tobacco leaves are packed into the flue-baskets. Thus, for example, Sumatra tobacco requires a greater time to condition than Connecticut tobacco. Thus, also, tobacco packed in carrots in the flue-baskets requires a longer time than loosely spaced tobacco leaves such as those of an opened hand. By way of example merely, it might here be noted that I have been able to achieve uniform and effective conditioning of the tobacco leaves in less than 5% of the time required by the humidor method hereinabove briefly noted.

When the appropriate period of time has elapsed which, as above noted, is dependent upon various factors but which is exceedingly less than is required by present methods, the heating unit 18 is cut off from its source as by opening the switch 20. If the pumping apparatus has been maintained in operation, further exhausting is stopped, as by stopping the pump or pumps or by closing valve 34; valve 37 is then opened, but in such a way as to permit atmospheric air to slowly enter the apparatus. The continued evaporation of water in chamber 12—13 reduces the temperature of the water to cut down further evaporation, and preferably also valve 23 is opened to permit the entry of water into the bottom portion of the apparatus in order thus further to lower the temperature of the water in the chamber 12—13 and thus further to cut down evaporation of the latter. Substantial evaporation, however, soon ceases due to the actions immediately above described, it being also noted that the gradual admission of atmospheric air, the gradual drop in temperature, and the continued condensation of water vapor by coils 26 permit the ultimate restoration of the total pressure within the apparatus to substantially atmospheric pressure. The vapor pressure within the apparatus is thus reduced to that at substantially room temperature. In this manner, it is assured that no condensation of water vapor on the tobacco can take place. When the pressure gauge 53 indicates atmospheric pressure, the drain valve 25 may be opened and the water withdrawn from the apparatus. The dome-like upper portion 38 of the apparatus may then be lifted off by means of the ring 42 at its top and the flue-baskets containing the conditioned tobacco may be removed and may be replaced by other flue-baskets containing tobacco to be treated, whence the operations hereinbefore described may be repeated.

While, as hereinabove noted, I prefer to initially reduce the pressure within the apparatus to one which is on the order of 2 mm. of mercury, and while in so doing I prefer to use two such pumps as pumps 35 and 36 hereinabove described, it will be understood that many features and advantages of my invention may be successfully achieved in practice by reducing the pressure within the apparatus to a much lesser extent. For example, I may initially exhaust the apparatus to a pressure on the order of 55 mm. of mercury and in such case I may dispense with the fine pump, like pump 35, or use only the rough pump 36. When, however, I utilize a higher pressure, for example one on the order of 55 mm. of mercury, the various steps hereinabove described may be practiced but in such case I prefer to maintain the pump in operation throughout the conditioning period so that non-condensable gases may continue to be removed during the conditioning period, because such gases are not as completely removed. For example, if the pressure is reduced to about 2 mm. of mercury in the course of the initial pumping operation, upwards of 99% of the non-condensable gases of the air are, as already above noted, exhausted from the tobacco and from the walls and material of the interior of the apparatus. On the other hand, if the apparatus is operated at a pressure of about 55 mm. of mercury, the initial pumping operation removes only about 90% of the non-condensable gases from the apparatus. Hence, at the higher pressures it is desirable and preferred to maintain the pump in operation throughout the conditioning period so as to keep up the removal of the residue of non-condensable gases. Such action, however, as already above noted, has the further advantage that, in removing also some of the water vapor, the dynamic equilibrium which tends to establish itself, is further destroyed and thus more rapid and efficient flow of water vapor into contact with the tobacco may be achieved.

It might also be noted that the decrease in the level of the water in the apparatus as indicated by the water gauge 24 gives a visual indication of the rate of and extent to which the water is dissipated in the form of water vapor, and where it is feasible or desirable to operate the apparatus during the conditioning period without pumping non-condensable gases and some of the water vapor out of the apparatus the water gauge may thus serve as a substantially accurate guide to the quantity of water which has been taken up by the tobacco. If the pumping operation is continued throughout the conditioning or treating period, appropriate compensation for the withdrawal of water vapor from the apparatus may be made and the water gauge thus utilized to indicate the quantity of water vapor absorbed by the tobacco. Thus it will be seen that the progress of the treatment may be watched and, moreover, that the quantity of water vapor absorbed by the tobacco may by this means also be predetermined.

It is to be understood that I do not limit myself to the reduced pressures which have been hereinabove given by way of example and that many features of my invention may be achieved where the pressures are other than those specifically mentioned above.

It will thus be seen that there has been provided in this invention an art and apparatus in which the several objects hereinbefore noted, as well as many thoroughly practical advantages, are effectively achieved. It will be seen that the method may be rapidly and simply carried on, achieves highly uniform results, makes for great saving in time, and may be carried on with apparatus of simple and thoroughly practical yet inexpensive construction. Moreover, it is to be noted that discoloration and spotting of the tobacco leaves are effectively prevented and that many great advantages over heretofore known methods are achieved. The apparatus will be seen to be of convenient manipulation and capable of accurate control and, moreover, lends itself to rapid and efficient charging thereof with the products to be treated, as well as removal therefrom. It will also be noted that the apparatus is of compact construction and has a very high space factor. Furthermore, the art and apparatus thus provided by this invention will be seen to lend themselves readily to the varying conditions of hard practical use.

As many possible embodiments may be made of the mechanical features of the above invention and as the art herein described might be varied in various parts all without departing from the scope of the invention, it is to be understood that all matter hereinabove set forth or shown in the accompanying drawings is to be interpreted as illustrative and not in a limiting sense.

I claim:

1. The method of treating tobacco and the like, which consists in placing the tobacco in a flue which forms part of an enclosed vessel, exhausting the vessel to a relatively low pressure below atmospheric, evaporating water in the vessel, passing the water vapor to one end of said flue, and maintaining a flow of water vapor through said flue by condensing water vapor at the other end of said flue.

2. The method of treating tobacco and the like, which consists in placing the tobacco in a flue which forms part of an enclosed vessel, exhausting the vessel to a relatively low pressure below atmospheric, evaporating water in the vessel, passing the water vapor to one end of said flue, maintaining substantially constant the temperature of the water vapor, and maintaining a flow of water vapor through said flue by condensing water vapor at the other end of said flue.

3. The method of treating tobacco and the like, which consists in placing the tobacco in a flue which forms part of an enclosed vessel, exhausting the vessel to a relatively low pressure below atmospheric, evaporating water in the vessel, passing the water vapor to one end of said flue, maintaining substantially constant the temperature of the water vapor, and maintaining a flow of water vapor through said flue by removing water vapor from the other end of said flue.

4. The method of treating tobacco and the like, which comprises decreasing the density of the gas film adhering to the tobacco, and bringing water vapor into contact with the tobacco under an initial total pressure below 20 millimeters of mercury.

5. The method of treating tobacco and the like, which consists in placing tobacco in a vessel, exhausting the vessel to remove therefrom non-condensable gases and to decrease the density of gas films adhering to the tobacco, evaporating water in the vessel and subjecting the tobacco therein to the water vapor under relatively low total pressure below atmospheric, and preventing increase of said relatively low total pressure.

6. The method of treating tobacco and the like, which consists in subjecting tobacco to water vapor at relatively low total pressure and maintaining substantially constant the temperature of the water vapor.

7. In apparatus of the character described, in combination, a base portion of substantially round cross-section provided with an inner substantially concentric wall adapted to form thereby an inner chamber and an outer annular chamber, a receptacle having a pervious bottom adapted to rest upon said inner wall and by its side wall portions to form an upward extension thereof, a closure member adapted to be mounted upon and sealed to the outer wall of said base member and to form therewith a hermetically sealed vessel closing said receptacle, means for reducing the pressure within said vessel, means for evaporating water in one of said chambers, and means for condensing water vapor in the other of said chambers.

8. In apparatus of the character described, in combination, a base portion of substantially round cross-section provided with an inner substantially concentric wall adapted to form thereby an inner chamber and an outer annular chamber, a receptacle having a pervious bottom adapted to rest upon said inner wall and by its side wall portions to form an upward extension thereof, a closure member adapted to be mounted upon and sealed to the outer wall of said base member and to form therewith a hermetically sealed vessel enclosing said receptacle, means for evaporating water in one of said chambers, and means for maintaining a movement of water vapor from said one chamber, through said receptacle, and into the other of said chambers.

9. In apparatus of the character described, in combination, a base portion of substantially round cross-section provided with an inner substantially concentric wall adapted to form thereby an inner chamber and an outer annular chamber, a receptacle having a pervious bottom adapted to rest upon said inner wall and by its side wall portions to form an upward extension thereof, a closure member adapted to be mounted upon and sealed to the outer wall of said base member and to form therewith a hermetically sealed vessel enclosing said receptacle, means for evaporating water in one of said chambers, means for condensing water vapor in the other of said chambers, and means for removing water vapor from said other of said chambers.

10. In apparatus of the character described, in combination, a vessel provided with means for receiving a product to be treated, means for exhausting the vessel to produce therein a relatively low pressure, and means for maintaining a flow of water vapor past and in contact with the product to be treated at substantially constant temperature and at relatively low total pressure below atmospheric.

11. In apparatus of the character described, in combination, a base portion of substantially round cross-section provided with an inner substantially concentric wall adapted to form thereby an inner chamber and an outer annular chamber, a receptacle having a pervious bottom adapted to rest upon said inner wall and by its side wall portions to form an upward extension thereof, a closure member adapted to be mounted upon and sealed to the outer wall of said base member and to form therewith a hermetically sealed vessel enclosing said receptacle, means for supplying water vapor to one of said chambers, and means for reducing the pressure in the other of said chambers.

12. In apparatus of the character described, in combination, a hermetically sealed vessel, means therein forming substantially a guiding flue and adapted to receive a product to be treated, means for exhausting said vessel to a relatively low pressure, means for supplying water vapor at relatively low total pressure to one end of said flue, and means for condensing water vapor as the latter emerges from the other end of said flue.

13. In apparatus of the character described, in combination, a hermetically sealed vessel, means therein forming substantially a guiding flue and adapted to receive a product to be treated, means within said vessel for receiving a supply of water and connected to one end of said flue, means for applying heat to evaporate the water in said last-mentioned means, and means for maintaining a difference between the pressure at one end of said flue and the pressure at the other end thereof so that water vapor emerges from the other end of said flue.

14. In apparatus of the character described, in combination, a hermetically sealed vessel, means therein forming substantially a guiding flue and adapted to receive a product to be treated, means within said vessel for receiving a supply of water and connected to one end of said flue, means for applying heat to evaporate the water in said last-mentioned means, and means for condensing water vapor at the other end of said flue.

15. In apparatus of the character described, in combination, a hermetically sealed vessel, means therein forming substantially a guiding flue and adapted to receive a product to be treated, means within said vessel for receiving a supply of water and connected to one end of said flue, means for applying heat to evaporate the water in said last-mentioned means, and means for removing water vapor substantially as the latter emerges from the other end of said flue.

16. In apparatus of the character described, in combination, a hermetically sealed vessel, means therein forming substantially a guiding flue and adapted to receive a product to be treated, means within said vessel for receiving a supply of water and connected to one end of said flue, heating means for evaporating water in said last-mentioned means at relatively low temperature, means controlling said heating means so that the temperature of the water vapor is maintained substantially constant, and means for maintaining a flow of water vapor in a direction toward the other end of said flue.

17. In apparatus of the character described, in combination, means for producing water vapor at relatively low substantially constant total pressure, below atmospheric, and means for exposing the product to be treated to said water vapor.

18. In apparatus of the character described, in combination, means for producing water vapor at relatively low total pressure below atmospheric, means for maintaining substantially constant the temperature of the water vapor, and means for exposing the product to be treated to said water vapor.

19. The method of treating tobacco and the like, which consists in placing the tobacco in an enclosed vessel, admitting water into the vessel while maintaining it out of contact with the tobacco, exhausting gases from the vessel to create in the vessel a relatively low pressure below atmospheric, heating the water in the vessel to supply water vapor to the tobacco, and maintaining substantially constant the temperature of the water vapor.

20. In apparatus of the character described, in combination, an enclosed vessel adapted to receive tobacco, a pump capable of reducing the pressure in the vessel to a predetermined value, a second pump capable of reducing the pressure in the vessel to a value less than that of which said first pump is capable, means adapted at will to cause either pump alone or both pumps together to reduce the pressure in the vessel, and means for supplying water vapor to the tobacco in the vessel.

21. In apparatus of the character described, in combination, an enclosed vessel adapted to receive tobacco, a pump capable of reducing the pressure in the vessel to a predetermined value, a second pump capable of reducing the pressure in the vessel to a value less than that of which said first pump is capable, means connecting said pumps serially so that said second-mentioned pump is connected to the exhaust of said first-mentioned pump, and means for supplying water vapor to the tobacco in the vessel.

22. In apparatus of the character described, in combination, means for producing water vapor at relatively low total pressure, means forming a path of flow for said water vapor, means for holding a product to be treated in the path of flow of the water vapor, and means for condensing water vapor adjacent the end of said path-forming means.

23. In apparatus of the character described, in combination, an enclosed vessel, means therein forming a path of flow for water vapor, means for holding tobacco to be treated in the path of flow of the water vapor, means for exhausting the vessel to a relatively low pressure, means for supplying water vapor at relatively low total pressure to said path of flow, said pressures being below atmospheric, and means operable, after the conclusion of the treatment, for slowly admitting air to said vessel and at a rate such that condensation of water vapor upon the tobacco is prevented.

24. In apparatus of the character described, in combination, an enclosed vessel, means therein forming a path of flow for water vapor, means for holding tobacco to be treated in the path of flow of the water vapor, means for exhausting the vessel to a relatively low pressure, means for supplying water vapor at relatively low total pressure to one end of said path-forming means, and means for condensing water vapor at the exit end of said path-forming means.

25. In apparatus of the character described, in combination, an enclosed vessel, means therein forming a path of flow for water vapor, means for holding tobacco to be treated in the path of flow of the water vapor, means for exhausting the vessel to a relatively low pressure, means for supplying water vapor at relatively low total pressure to one end of said path-forming means, and means for condensing water vapor at the exit end of said path-forming means, said exhausting means having a connection to a point at the exit end of said path-forming means.

26. In apparatus of the character described, in combination, an enclosed vessel, means therein forming a path of flow for water vapor, means for holding tobacco to be treated in the path of flow of the water vapor, means for exhausting the vessel to a relatively low pressure below atmospheric, means in connection with said vessel for holding a supply of water subjected to said pressure, means for heating the water, and means responsive to the temperature of the water for controlling the heating thereof.

27. In apparatus of the character described, in combination, means forming a sealed chamber and comprising two inter-fitted sections, one of which is removable with respect to the other, a receptacle for receiving tobacco positioned within said chamber and adapted to be removed therefrom upon removal of one of said sections, and means for producing water vapor within said chamber at such a low pressure that the pressure of the atmosphere upon the sections of said chamber holds said sections together.

28. The method of treating tobacco and the like, which comprises placing the tobacco in a vessel, exhausting the vessel to a total pressure below 20 millimeters of mercury to remove non-condensable gases therefrom, and then subjecting the tobacco in the vessel to water vapor under relatively low total pressure below atmospheric.

29. The method of treating tobacco and the like, which comprises placing the tobacco in a vessel, exhausting the vessel to a total pressure below 20 millimeters of mercury to remove non-condensable gases therefrom, evaporating water in the vessel and subjecting the tobacco therein to the water vapor under relatively low total pressure below atmospheric.

30. The method of treating tobacco and the like, which comprises placing the tobacco in a vessel, exhausting the vessel to a total pressure below 20 millimeters of mercury to remove non-condensable gases therefrom, subjecting the tobacco to water vapor under relatively low total pressure, and preventing substantial addition of heat to the tobacco under treatment.

31. The method of treating tobacco and the like, which comprises placing the tobacco in a vessel, exhausting the vessel to a total pressure of about 2 millimeters of mercury to remove non-condensable gases therefrom and then bringing water vapor into the vessel in contact with the tobacco at an increasing but sub-atmospheric total pressure.

32. The method of treating tobacco and the like, which comprises placing the tobacco in a vessel, exhausting the vessel to a total pressure below 20 millimeters of mercury to remove non-condensable gases therefrom and then bringing water vapor into the vessel in contact with the tobacco at an increasing but sub-atmospheric total pressure.

FRANKLIN S. SMITH.